(12) United States Patent
Wakamatsu

(10) Patent No.: US 8,971,696 B2
(45) Date of Patent: Mar. 3, 2015

(54) SHAKE COMPENSATION CONTROL APPARATUS, OPTICAL DEVICE, IMAGE CAPTURING APPARATUS, AND CONTROL METHOD OF SHAKE COMPENSATION

(75) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/490,817

(22) Filed: Jun. 7, 2012

(65) Prior Publication Data
US 2013/0004151 A1    Jan. 3, 2013

(30) Foreign Application Priority Data

Jul. 1, 2011   (JP) .................................. 2011-147528

(51) Int. Cl.
G03B 17/00        (2006.01)
(52) U.S. Cl.
USPC ........................... 396/55; 348/208.7; 359/554
(58) Field of Classification Search
USPC ............. 396/52–55; 348/208.4, 208.5, 208.7, 348/208.8, 208.11; 359/554
See application file for complete search history.

(56) References Cited

U.S. PATENT DOCUMENTS

| | | | |
|---|---|---|---|
| 5,649,237 | A | 7/1997 | Okazaki |
| 6,225,614 | B1 * | 5/2001 | Ono ................................. 396/55 |
| 8,477,201 | B2 * | 7/2013 | Washisu .................... 348/208.99 |
| 8,509,609 | B2 * | 8/2013 | Wakamatsu ..................... 396/55 |
| 2005/0018051 | A1 | 1/2005 | Tomita et al. |
| 2010/0013937 | A1 | 1/2010 | Washisu et al. |
| 2010/0118156 | A1 * | 5/2010 | Saito ........................... 348/208.6 |
| 2011/0013031 | A1 | 1/2011 | Miyasako |
| 2012/0092511 | A1 * | 4/2012 | Wakamatsu ................ 348/208.2 |
| 2013/0162850 | A1 * | 6/2013 | Noguchi ..................... 348/208.4 |
| 2013/0163972 | A1 * | 6/2013 | Miyazawa ....................... 396/55 |

FOREIGN PATENT DOCUMENTS

| | | |
|---|---|---|
| CN | 1577033 A | 2/2005 |
| CN | 101959019 A | 1/2011 |
| JP | 7-225405 A | 8/1995 |
| JP | 2010-025962 A | 2/2010 |

OTHER PUBLICATIONS

Sep. 1, 2014 Chinese Official Action in Chinese Patent Appln. No. 201210228059.7.

* cited by examiner

Primary Examiner — Christopher Mahoney
(74) Attorney, Agent, or Firm — Fitzpatrick, Cella, Harper & Scinto

(57) ABSTRACT

A rotational shake compensation calculation unit in an image capturing apparatus calculates rotational shake produced by apparatus rotation about an axis orthogonal to an optical axis of an imaging optical system, thereby calculating a compensation amount for image shake. A translational shake compensation calculation unit calculates a compensation amount for image shake resulting from translational shake produced in a travel direction of the apparatus along a direction orthogonal to an optical axis of the optical system. An estimating device estimates translational shake using a vibration model. A translational shake compensation amount calculation unit calculates a translation shake compensation amount based on the estimation amount and varies the translation shake compensation amount in response to the compensation range of the shake compensation unit of the focal distance of the optical system. The compensation amounts for translational shake and rotational shakes are combined, thereby controlling shake compensation unit driving.

26 Claims, 11 Drawing Sheets

SHAKE COMPENSATION CONTROL APPARATUS, OPTICAL DEVICE, IMAGE CAPTURING APPARATUS, AND CONTROL METHOD OF SHAKE COMPENSATION

BACKGROUND OF THE INVENTION

1. Field of the Invention

The present invention relates to a control technique of shake compensation configured to prevent image deterioration by compensating for image shake caused by vibration resulting from camera shake, or the like.

2. Description of the Related Art

A camera is commercially available that includes a shake compensation control apparatus including a shake compensation unit, drive unit, vibration detection unit, and the like configured to prevent image shake due to camera shake or the like and thereby reduce factors that result in an imaging error by a photographer.

In this context, a shake compensation control apparatus will be briefly described. To enable performance of imaging without image shake even when camera shake occurs during the imaging operation, shaking of the camera resulting from camera shake is detected and displacement control of an image shake compensation lens (hereinafter referred to as a "shake compensation lens (image blur correction lens)") or imaging element is executed in response to a detection value. That process requires accurate detection of camera vibration and compensation of variation in the optical axis due to shaking. In principle, vibration detection is executed by the vibration detection unit calculating a detection result such as a rotational velocity or the like. Image shake can be suppressed by controlling a vibration detection unit based on the calculation processing result to thereby displace the shake compensation lens (image blur correction lens) or the imaging element.

A variety of optical devices include an apparatus that is configured to detect rotational shake using a rotational velocity meter and drive an imaging lens or imaging element to thereby reduce image shake. However, when imaging at a close range (imaging conditions associated with a high imaging magnification), vibration occurs that cannot be detected only by use of a rotational velocity meter. For example, it is not possible to ignore image deterioration caused by vibration resulting from shake that is applied in a horizontal or vertical direction in a plane that is orthogonal to the optical axis of the camera, in other words, so-called translational shake. For example, macro-imaging by approaching to about 20 cm of the object to be imaged requires active detection and compensation of translational shake. It is also necessary to detect and compensate for translational shake during imaging under conditions when the focal distance of the imaging optical system is extremely large (for example, 400 mm) even when the object to be imaged is positioned at a distance of approximately one meter from the camera.

The technique disclosed in Japanese Patent Application Laid-Open No. 7-225405 is configured to calculate translational shake by application of double integration to the acceleration detected by an acceleration meter and thereby drive a shake compensation unit by including the output of a separately provided rotational velocity meter. However, the output of the acceleration meter used in the detection of translational shake exhibits a tendency to be affected by environmental fluctuation such as disturbances, noise or temperature change. Consequently, high accuracy compensation of translational shake is difficult since the effect of these unstable factors is further increased by double integration of the detected acceleration.

Japanese Patent Application Laid-Open No. 2010-25962 discloses calculation of translational shake by treating translational shake as rotational shaking when there is a center of rotation at a position separated from the camera. This method executes shake compensation by providing a rotational velocity meter and an acceleration meter and using the output of those meters to calculate a compensation value and an angle using a rotation radius of the rotational shake. A reduction in accuracy resulting from unstable factors caused by an acceleration meter as described above can be mitigated by calculation of a rotation center and limiting to frequency bands in which the effect of disturbances is low.

In a conventional technique, compensation of translational shake is associated with the following conditions. Although it is preferred that the mounting position for the acceleration meter is the lens principal point in a method using an acceleration meter in a detection unit for executing compensation of translational shake, it is difficult to provide an acceleration meter in proximity to the lens principal point.

Japanese Patent Application Laid-Open No. 2010-25962 discloses a method of detecting shake using the output of an imaging unit in substitution for an acceleration meter as a shake detection unit. When shake is detected using the output of an imaging unit, a method may be used in which a compensation coefficient (correction coefficient) is calculated from the relationship between the image shake and the rotational shake immediately prior to the imaging operation, and the compensation is applied to rotational shake during the imaging operation. In this case, translational shake compensation is only not performed during the imaging operation.

Japanese Patent Application Laid-Open No. 2010-25962 also discloses a method of detecting acceleration of translational shake from the current that flows in the driving coils in substitution for an acceleration meter as a shake detection unit. However, this method does not enable performance of shake compensation unit immediately prior to the imaging operation.

The present invention has the object of improving operational characteristics with a downsized configuration and executing high accuracy image shake compensation in relation to translational shake without reference to a change in a focal distance or a shake compensation range.

SUMMARY OF THE INVENTION

An apparatus according to the present invention that is configured to solve the above circumstances is a shake compensation control apparatus configured to detect shake applied to an apparatus that includes an imaging optical system and thereby compensate for image shake. The apparatus includes a shake compensation unit, a compensation amount calculation unit configured to calculate a compensation amount using a shake amount for the apparatus including translational shake produced in a direction of travel of the apparatus along a direction that is orthogonal to an optical axis of the imaging optical system, an estimation unit that is configured from a vibration model for the shake compensation unit in order to estimate translational shake by inputting a position detection signal for a driven unit and a drive indication signal to a driven unit that configures the shake compensation unit, and a drive unit configured to drive the shake compensation unit in accordance with the compensation amount. The compensation amount calculation unit is configured to calculate so that the compensation amount is reduced when the focal distance of the imaging optical system is increased when the compensation amount for translational shake is calculated based on the estimated amount for translational shake obtained from the estimation unit.

According to the present invention, high accuracy image shake compensation can be executed in relation to translational shake without reference to a change in a focal distance or a shake compensation range.

Further features of the present invention will become apparent from the following description of exemplary embodiments (with reference to the attached drawings).

DESCRIPTION OF THE EMBODIMENTS

The preferred embodiments for execution of the present invention will be described below with reference to the figures. In addition to a digital single lens reflex camera, or a digital compact camera, a shake compensation control apparatus according to the present invention can be mounted on various types of image capturing apparatuses or optical devices such as digital video cameras, surveillance cameras, Web cameras, and mobile telephones.

Figure 1A:
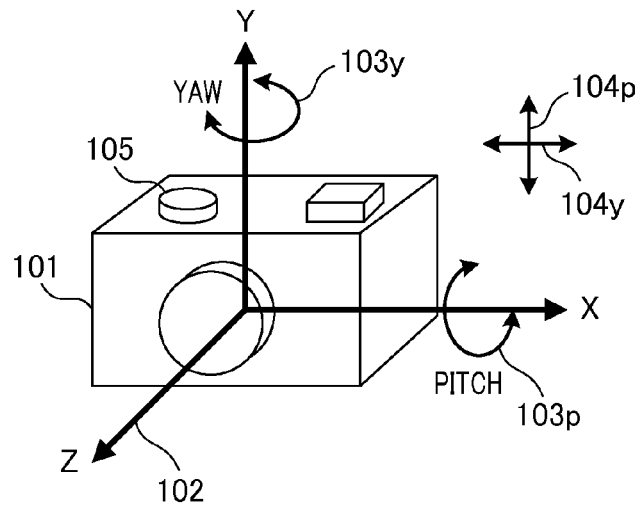
FIG. 1A illustrates a shake direction of an image capturing apparatus.

FIG. 1A illustrates a shake direction of an image capturing apparatus 101. The shake compensation control apparatus executes shake compensation with reference to shake produced by rotation of the apparatus about an axis that is orthogonal to the optical axis 102 of the imaging optical system (hereinafter referred to as "rotational shake". Refer to the arrows 103$p$, 103$y$). The shake compensation control apparatus also executes shake compensation with reference to shake produced along the direction of travel of the apparatus in a direction orthogonal to the optical axis 102 (hereinafter referred to as "translational shake". Refer to the arrows 104$p$, 104$y$). The three dimensional coordinates illustrated by the X axis, the Y axis, and the Z axis in FIG. 1A are such that the Z axis direction is set to the direction of the optical axis, and the X axis and the Y axis are orthogonal to the Z axis. The X axis rotation direction is the pitch direction (refer to the arrow 103$p$), and the Y axis rotation direction is the yaw direction (refer to arrow 103$y$). The direction of translational shake illustrated by the arrow 104$y$ is parallel to the X axis and the direction of translational shake illustrated by the arrow 104$p$ is parallel to the Y axis.

First Exemplary Embodiment

A first exemplary embodiment will be described below.

Figure 1B:
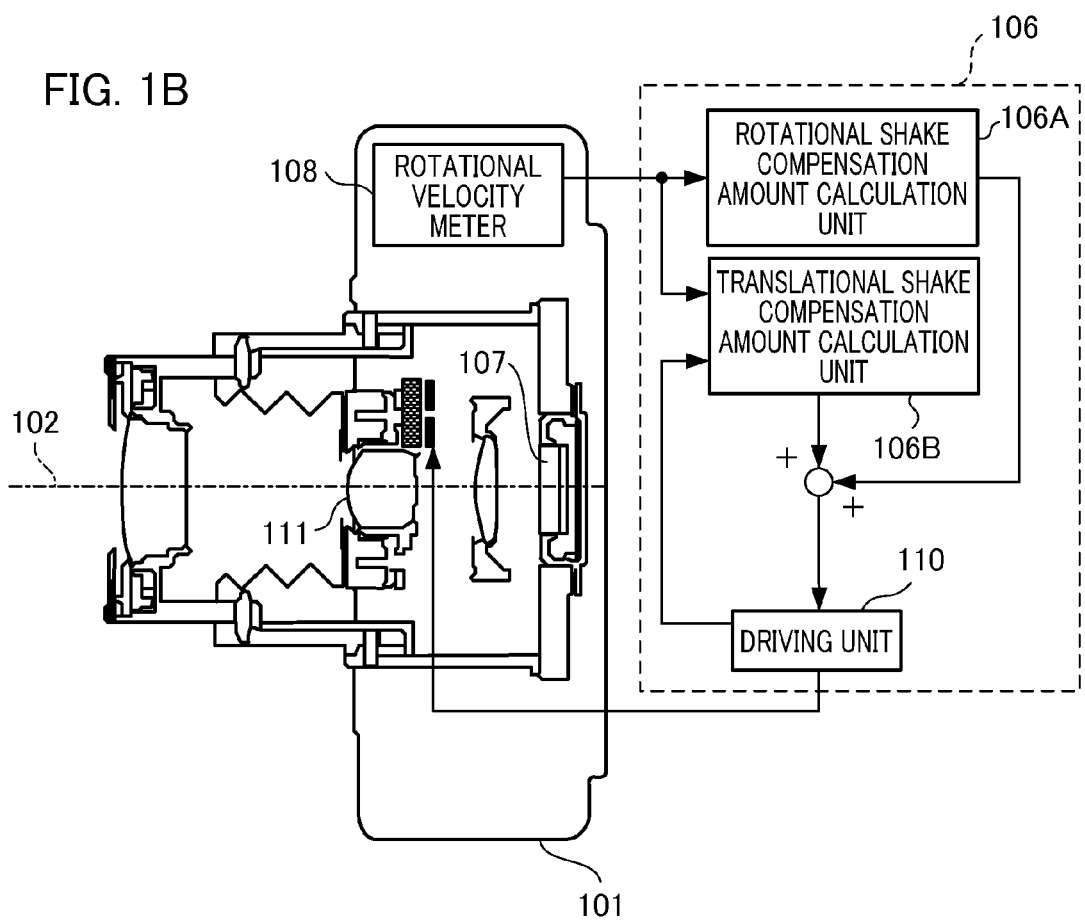
FIG. 1B schematically illustrates an image capturing apparatus mounting a shake compensation control apparatus according to a first exemplary embodiment of the present invention.

FIG. 1B is a plan view schematically illustrating the image capturing apparatus 101 provided with a shake compensation control apparatus according to the first exemplary embodiment. The functional block diagram illustrated in FIG. 1B includes the configuration of the imaging unit of the image capturing apparatus 101 and the imaging shake compensation processing executed by a central processing unit (CPU) 106.

The imaging element and the shake compensation lens (image blur correction lens) of the shake compensation unit 111 are positioned on the optical axis 102 of the imaging optical system. The rotational velocity 108 detects rotational shake, and a rotational velocity detection signal is output to two compensation amount calculation units. The rotational shake compensation amount calculation unit 106A calculates a compensation amount for image shake in relation to rotational shake. Furthermore, the translational shake compensation amount calculation unit 106B calculates a compensation amount for image shake in relation to translational shake. The outputs of these calculation units are sent to a drive unit 110 after calculation. The drive unit 110 drives the shake compensation lens (image blur correction lens) of the shake compensation unit 11 to thereby execute shake compensation in relation to both rotational shake and translational shake.

In the present exemplary embodiment, detection of translational shake is executed by use of a signal output from the drive unit 110 to the translational shake compensation amount calculation unit 106B. The details thereof will be described below.

In the example illustrated in FIG. 1B, a shake compensation means displaces the shake compensation lens (image blur correction lens) within a plane that is vertical with respect to the optical axis with reference to a calculation compensation amount. A method of compensating for image shake is not limited to shake compensation lens (image blur correction lens) image shake compensation and includes a method in which shake compensation is performed by displacing the imaging element in a plane that is vertical with respect to the optical axis. In addition there is a method using electronic shake compensation in which the effect of shake is reduced by varying the segmenting position for an image in each imaging frame output by the imaging element. Furthermore, image shake compensation may be performed by combination of a plurality of such shake compensation methods.

Next, a configuration example of a shake compensation unit 111 will be described making reference to the exploded perspective view in FIG. 2.

The base 401 of the shake compensation unit 111 retains a shutter mechanism and an ND filter mechanism. A follower pin 402 is integrally provided on the base 401, and includes a moveable follower pin (not illustrated). Three cam grooves are formed in a cam barrel (not illustrated) on an outer radial side of the base 401. The follower pin 402 is engaged in and oscillates along the cam groove with reference to the optical axis. Further details are omitted.

A shake compensation lens (image blur correction lens) group 406 is integrally retained on a shift lens holder 416 by a staking claw (not illustrated). A lens cover 403 includes an aperture unit that limits the optical flux that passes through the shake compensation lens (image blur correction lens) group 406, and forms openings 405 respectively at three positions of an arm 404 provided on a side surface portion. A protrusion 415 is provided at three positions on a side surface of the shift lens holder 416, and the lens cover 403 is integrally retained with the shift lens holder 416 by respective engagement of the protrusions with the holes 405. A magnet 412, 413 that configures an electromagnetic mechanism is retained on the shift lens holder 416.

The shift lens holder 416 is pressed into contact with the base via three balls 407. That is to say, each ball 10 is a moveable support member with respect to the shift lens holder 416. Coordinated movement of these components configures the shift lens holder 416 to be supported to displace freely with respect to the base 401 in a plane vertical to the optical axis. This configuration enables the effect that vibration can be realized at a higher frequency and a lower amplitude than a method using a guide bar. Therefore, superior image shake compensation can be realized in a digital camera associated with enhanced pixelization.

A thrust spring 414 biases the shift lens holder 416 in a direction to approach the base 401. The thrust spring 414 is an extension spring, one end is engaged with an extension claw of the shift lens holder 416 and the other end is engaged with an extension claw (not illustrated) that is formed on the base 401. Furthermore, a radial spring 417, 418 is provided to prevent rotation of the shift lens holder 416 and is respectively engaged with the extension claw (not illustrated) formed on the shift lens holder 416 or the base 401.

Coils 408, 409 are respectively retained on resin bobbins 410, 411. A metallic pin is integrally configured on a distal end of the bobbin to thereby connect the end portion of each coil. An electrical force is supplied from a circuit unit to each coil by soldering a conductive pattern of a flexible base plate (hereinafter abbreviated to "FPC") 424 to the pin. The coils 408, 409 are electrically connected through the metallic pin above to a land 425 on the FPC 424 that supplies electrical power to the coils 408, 409. A Hall element 422, 423 is used as a position detection unit and is respectively disposed in proximity to the magnets 412, 413 to detect a variation in the magnetic field associated with displacement of the magnets. The displacement amount of the shift lens holder 416 can be calculated using the magnetic detection signal. The Hall elements 422, 423 are also mounted on the FPC 424 and are supplied with electrical power.

A FPC 426 is a wiring member for supplying power to the shutter and a ND filter drive unit and is fixed to an FPC holder 420 together with the FPC 424. A cylindrical protrusion 421 is provided on the FPC holder 420 and these components are positionally determined and fixed by press fitting of the protrusion into a hole of the PFC 424, 426.

Figure 3:
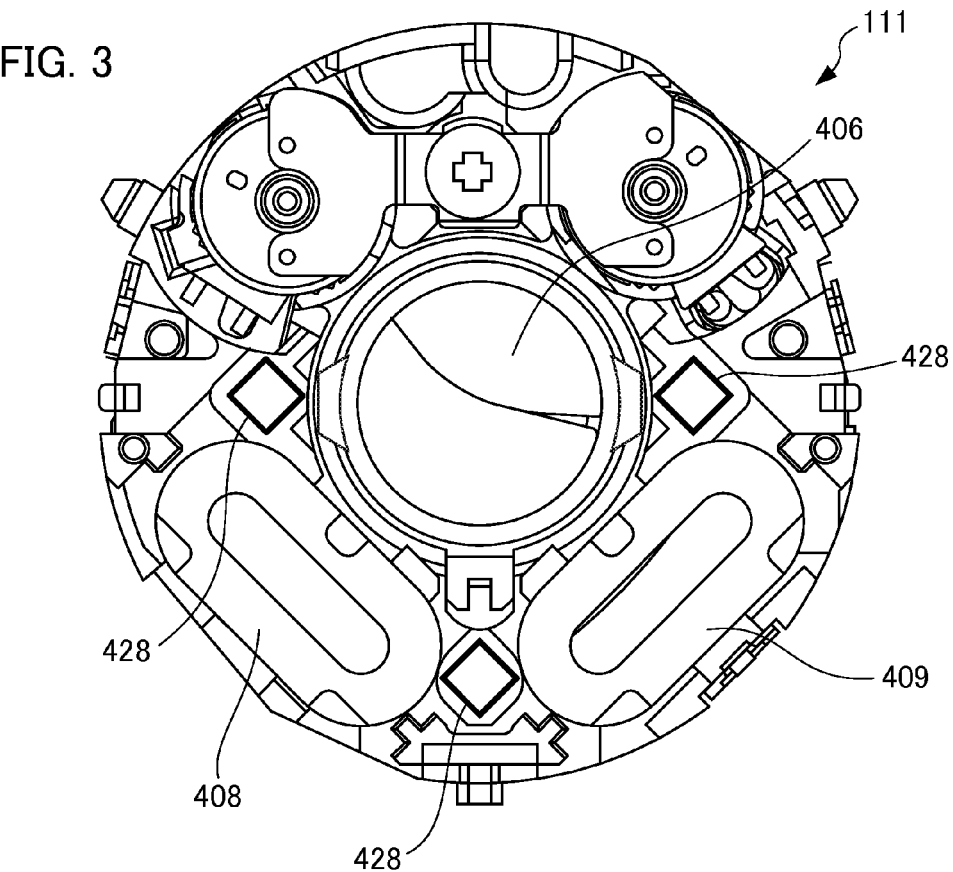
FIG. 3 illustrates the shake compensation mechanism when viewed from the optical axis direction.

FIG. 3 is a front view of the shake compensation unit 111 seen from the imaged body.

An indentation 428 is an accommodating unit disposed at the position of the three balls 407 respectively positioned in proximity to the shake compensation lens (image blur correction lens), that is to say, disposed at the apex of a triangle. Each single respective ball 407 is accommodated in the three indentations 428 formed on the base 401, and each ball is pressed into contact by point contact with the shift lens holder 416. This configuration enables control in which friction is reduced and the shake compensation lens (image blur correction lens) can track a target position with high accuracy, and thereby enables an enhanced estimated accuracy for translational shake.

Next, a method of control of the shake compensation lens (image blur correction lens) will be described.

Figure 4:
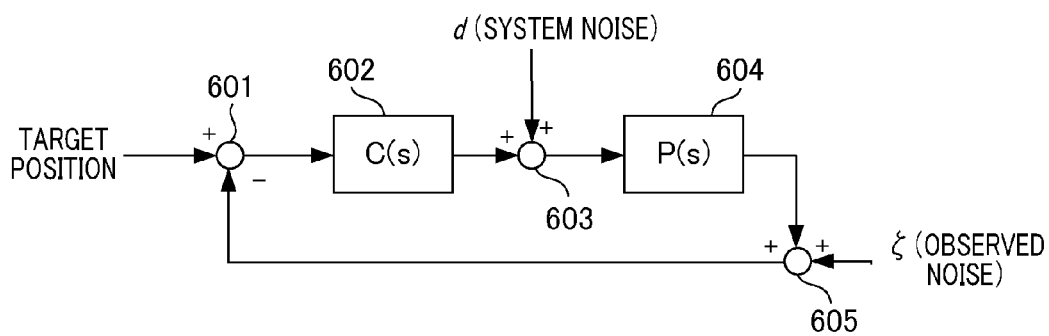
FIG. 4 is a block diagram illustrating a configuration example of a feedback control unit of the shake compensation mechanism.

FIG. 4 is a block diagram illustrating a calculation process executed by the drive unit 110.

The target position of the shake compensation lens (image blur correction lens) group 406 is input to a subtracting unit 601. The subtracting unit 601 calculates a deviation by subtraction of the current position indicated by the position detection signal from the target position. The position detection signal is configured as a digital signal by AD conversion of the output value of a position detection element such as a Hall element, or the like. Observed noise (refer to $\zeta$) is included in the output value of the Hall element, or the like, and is added by the adding unit 605. The observed noise is a noise component that is affected by noise of the sensor itself or noise that is electrically induced from the outside. The component of the observed noise is added to the actual shake compensation lens (image blur correction lens) position in the output of the Hall element.

The deviation calculated by the subtracting unit 601 is output to a feedback control controller 602 (refer to C(s) in FIG. 4), and the controller executes control so that the detection position of the sensor tracks the target position, that is to say, so that the deviation approaches a value of zero. However, after the system noise component (refer to "d") is added by the adding unit 603 to the output of the feedback control controller 602, the value is output to the shake compensation mechanism configured by a plant 604 (refer to P(s) in FIG. 4) to thereby impart a drive impelling force. The system noise is mainly an external disturbance resulting from the effect of gravitational acceleration due to a variation in the orientation of the image capturing apparatus or the effect of vibration acceleration produced by camera shake, or the like. The shake compensation lens (image blur correction lens) that configures the shake compensation mechanism is driven with reference to the effect of observed noise or system noise in accordance with the characteristics of the plant 604 and the characteristics of the feedback control controller 602 and the target position.

Next, the shake compensation mechanism and a method of detection of translational shake that uses a drive unit will be described.

Figure 5A:
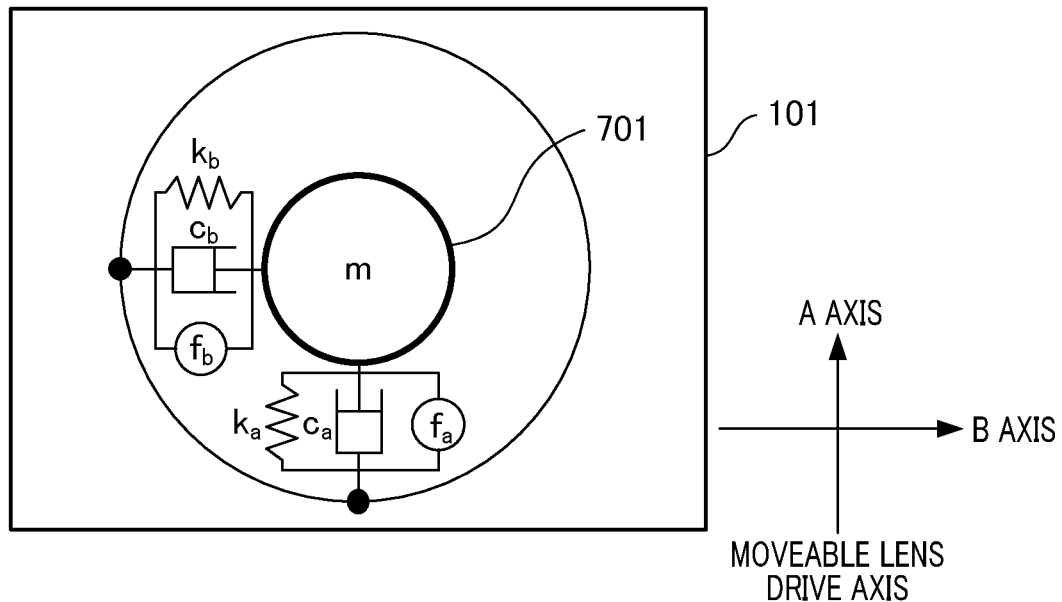
FIG. 5A illustrates a modeling of the vibration of a driven unit in the shake compensation mechanism.

Firstly, modeling of the plant as illustrated in FIG. 5A is performed using two mutually orthogonal axes in relation to the shake compensation mechanism. The orthogonal A axis and B axis respectively represent the drive shaft of the moveable lens (shake compensation lens (image blur correction lens)). The driven unit 701 of the shake compensation mechanism is respectively driven along each shaft by the driving unit with an inertial mass m. The spring constant of the first drive unit is denoted as $k_a$, the damping coefficient is denoted as $c_a$, and the impelling force is denoted as $f_a$. The spring constant of the second drive unit is denoted as $k_b$, the damping coefficient is denoted as $c_b$, and the impelling force is denoted as $f_b$.

Figure 5B:
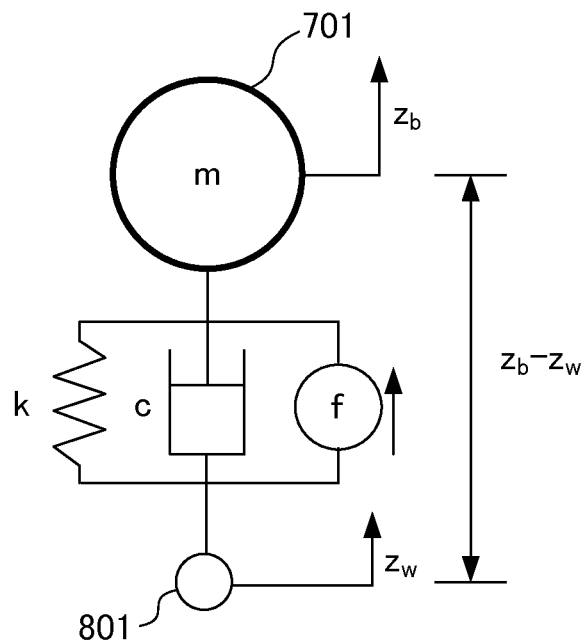
FIG. 5B illustrates a vibration model having one degree of freedom.

FIG. 5B illustrates an example of the vibration model of one shaft of the two shafts above. That is to say, FIG. 5B is a schematic figure of the modeling of vibration with one degree of freedom of the driven unit of the shake compensation mechanism including the shake compensation lens (image blur correction lens). The fixed unit 801 illustrates the portion (camera main body portion) that supports the driven unit of the shake compensation mechanism. In the model, the absolute position of the driven unit 701 including the shake compensation lens (image blur correction lens) is denoted as $z_b$, and the absolute position of the fixed unit 801 is denoted as $z_w$. The spring constant of the drive unit is denoted as k, the damping coefficient is denoted as c, and the impelling force that is produced by supply of electrical power to the coils of the shake compensation mechanism is denoted as f. The method of operating the modeling system in relation to the driven unit 701 (mass m) is shown in Equation (1) below in Newtonian notation.

[Equation 1]

$$m \cdot \ddot{z}_b = -k \cdot (z_b - z_w) - c \cdot (\dot{z}_b - \dot{z}_w) + f \quad (1)$$

Figure 2:
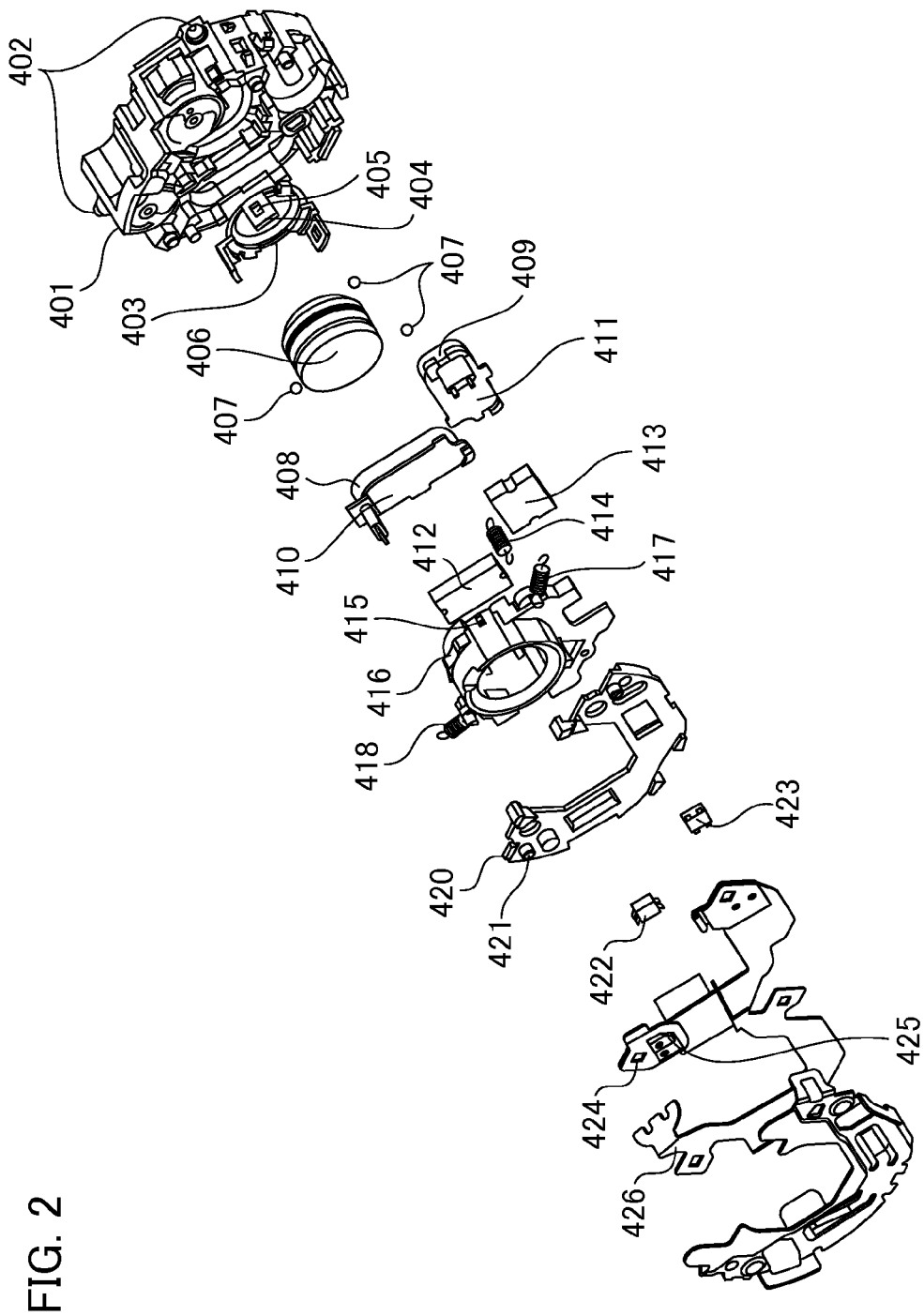
FIG. 2 is an exploded perspective view illustrating a configuration example to describe the shake compensation mechanism in conjunction with FIG. 3.

The relative displacement of the driven unit 701 and the fixed unit 801 in the shake compensation mechanism can be detected by the position detection element (refer to the Hall elements 422, 423 in FIG. 2). Since the relative displacement of the driven unit 701 and the fixed unit 801 can be observed and output, the relative displacement of those components is defined in Equation (2) below.

[Equation 2]

$$z_0 = z_b - z_w \quad (2)$$

The state parameter is defined as illustrated below.

[Equation 3]

$$x = [\dot{z}_b, z_0]^T$$

When $y = z_o$, and $u = f$, the absolute velocity of the fixed unit is w.

[Equation 4]

$$w = \dot{z}_w$$

Equation (3) below is obtained as a state equation by use of the definition above and Equation (1).

[Equation 5]

$$\dot{x}(t) = Ax(t) + Bu(t) + Gw(t)$$

$$y(t) = Cx(t) + Du(t) + v(t) \quad (3)$$

v(t) in the above equation represents the observed noise and is Gaussian white noise. The average value and covariance of w and v are known, and therefore observed noise is expressed in Equation (4).

[Equation 6]

$$E[w(t)] = 0, E[w(t)w^T(\tau)] = Q\delta(t-\tau)$$

$$E[v(t)] = 0, E[v(t)v^T(\tau)] = R\delta(t-\tau) \quad (4)$$

A to D and G in Equation (3) are expressed in Equation (5) below.

[Equation 7]

$$A = \begin{bmatrix} -\dfrac{c}{m} & -\dfrac{k}{m} \\ 1 & 0 \end{bmatrix},$$

$$B = \begin{bmatrix} \dfrac{1}{m} \\ 0 \end{bmatrix}, G = \begin{bmatrix} \dfrac{c}{m} \\ -1 \end{bmatrix},$$

$$C = [0 \ 1], D = [0] \quad (5)$$

When it is considered that the relative displacement of the driven unit 701 and the fixed unit 801 in the shake compensation mechanism can be measured, the estimation unit expressed by Equation (3) can be expressed as illustrated in Equation (6) below.

[Equation 8]

$$\dot{\hat{x}} = A\hat{x} + Bu + L(y - C\hat{x}) \quad (6)$$

L is the observer gain and is a Kalman filter gain that is obtained in advance by solving a Riccati equation as illustrated in Equation (7) below.

[Equation 9]

$$AP + PA^T - PC^TR^{-1}CP + Q = 0 \quad (7)$$

L is determined by Equation (8) below using a positive symmetric solution.

[Equation 10]

$$L = PC^TR^{-1} \quad (8)$$

Use of the estimation unit enables estimation of the absolute velocity (first differential of $z_b$) of the driven unit 701 of the shake compensation mechanism that is a state parameter and a relative displacement $z_o$ of the driven unit 701 and the fixed unit 801. The absolute velocity (first differential of $z_w$) of the fixed unit 801, that is to say, of the camera main body can be detected by obtaining the first derivative of the estimated relative displacement $z_o$ and subtracting from the absolute velocity of the driven unit 701. When the first derivative of the estimated relative displacement $z_o$ is a value that is extremely small in comparison to the absolute velocity of the driven unit 701, this value may be used without modification as the translational shake compensation as the absolute velocity of the camera main body. In this case, $dz_b$ is treated as $dz_w$ since $dz_o$ is small, and the subtraction step is not required.

Figure 6:
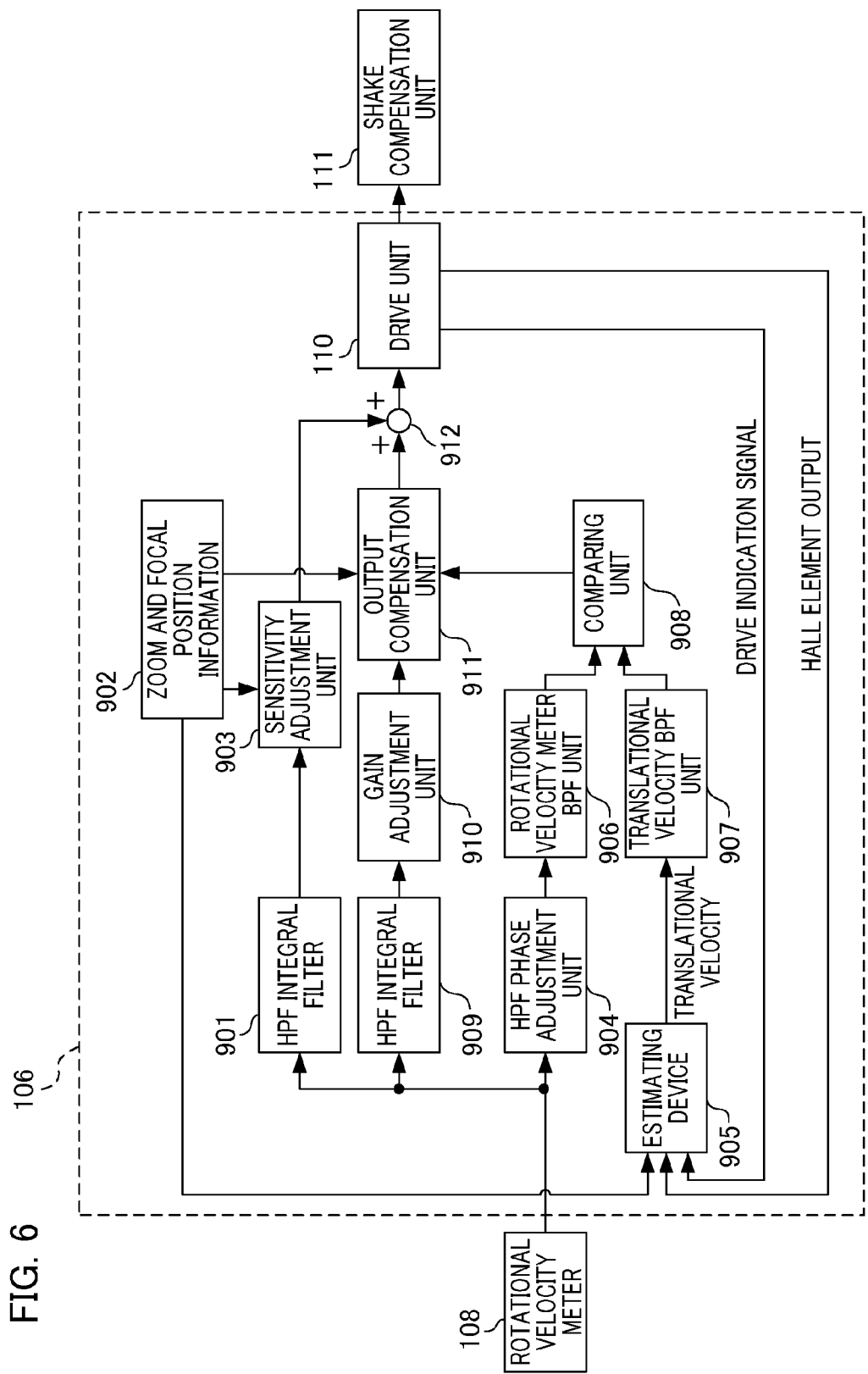
FIG. 6 is a block diagram illustrating a configuration example of the shake compensation control apparatus according to the first exemplary embodiment.

FIG. 6 is a block diagram illustrating a configuration example of the shake compensation control apparatus. In the following description, only the configuration of shake produced in a perpendicular direction (pitch direction: refer to arrows 103p and 104p in FIG. 1A) of the image capturing apparatus is described. Although the same configuration is provided also in relation to shake produced in a horizontal direction (yaw direction: refer to arrows 103y and 104y in FIG. 1A) of the image capturing apparatus, since both are basically the same in respects other than the direction, only one is herein described.

Firstly, compensation of rotational shake is described.

The rotational velocity detection signal of the rotational velocity meter 108 is input into the camera CPU 106 and processed by an HPF integral filter 901. The rotational velocity detection signal is integrated after cutting of direct current (DC) components by a high pass filter (HPF) that configures the HPF integral filter 901 and is converted to a rotational signal. The frequency band for camera shake is approximately 1 to 10 Hz, and the HPF characteristics includes characteristics that cut frequency components, for example of less than or equal to 0.1 Hz, that are sufficiently discrete from the shaking frequency band.

The output of the HPF integral filter 901 is input to a sensitivity adjustment unit 903. At that time, the sensitivity adjustment unit 903 amplifies the output of the HPF integral filter 901 based on zoom and focus position information 902, the imaging magnification calculated using that information, and the focal distance to thereby calculate a compensation target value for rotational shake. This operation is for the purpose of compensating a change in the ratio (shake compensation sensitivity) of the variation amount on the imaging surface relative to the displacement amount of the shake compensation unit 111 when the optical information varies as a result of a variation in optical information such as a focus adjustment of the imaging lens or a zoom operation. The calculated compensation target value for rotational shake is output to the drive unit 110 through an adding device 912, the shake compensation unit 111 is driven and thereby image shake is compensated for by the displacement control of the shake compensation lens (image blur correction lens).

Next, compensation of translational shake will be described.

Figure 7:
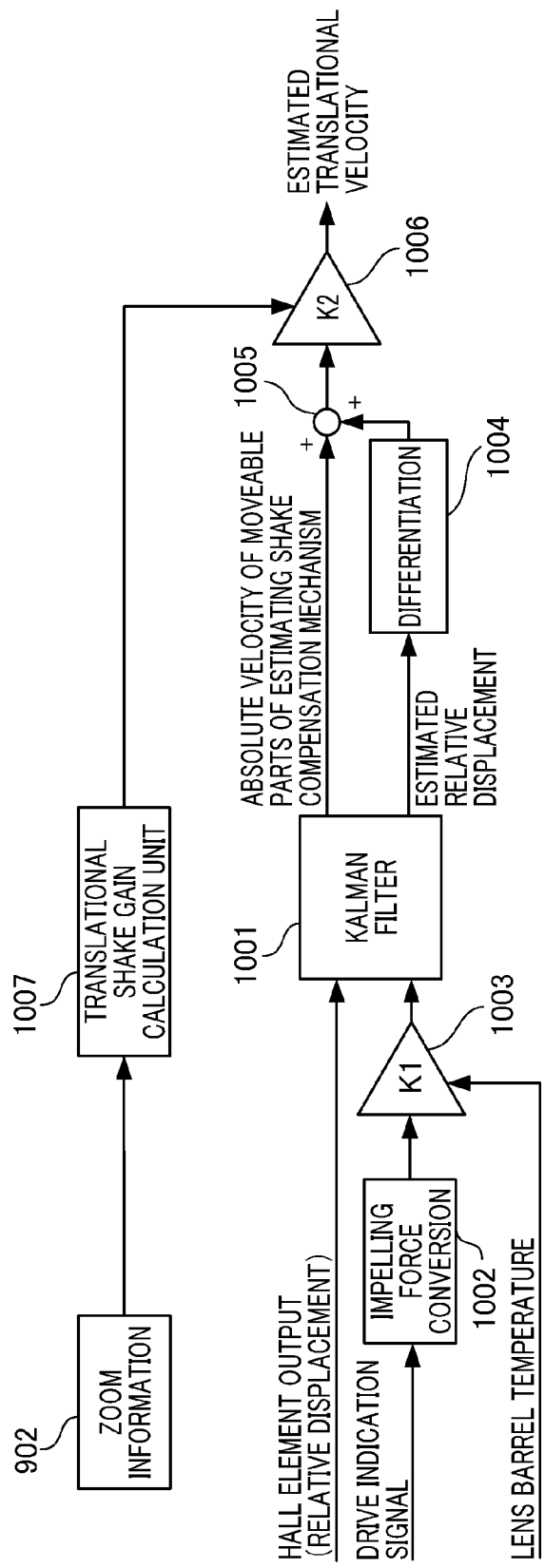
FIG. 7 is a block diagram illustrating a configuration example of an estimation device in FIG. 6.

In the present exemplary embodiment, as described above, a translational velocity (first derivative of $z_w$) is detected by the estimation unit using a Kalman filter. As described in relation to Equation 1 to Equation 8, the relative displacement of the driven unit 701 and the fixed unit 801 of the shake compensation unit 111 is taken as a state parameter, and the drive impelling force is used as an input variable to thereby estimate the absolute velocity of the driven unit 701 or the relative displacement of the driven unit 701 and the fixed unit 801. A drive indication signal, a position detection signal (Hall element output) from the drive unit 110, together with zoom lens position information (hereinafter termed "zoom information") 902 are input into the estimation device 905 that calculated the translational velocity. FIG. 7 is a block diagram illustrating a configuration example of an estimation device 905 in FIG. 6.

Information for relative displacement output by the Hall elements (refer to 422, 423 in FIG. 2) and information for impelling force indicating the drive indication signal from the drive unit 110 to the shake compensation unit 111 are input to the Kalman filter 1001. The drive impelling force is calculated using the following method. The impelling force conversion unit 1002 calculates the drive impelling force by multiplying a predetermined coefficient by a current value in order to convert the command current ordered by the feedback control controller 602 in FIG. 4 to an impelling force. The output of the impelling force conversion unit 1002 is input to a variable gain unit 1003 for temperature compensation. The temperature detection signal (lens barrel temperature signal) from a temperature sensor (not illustrated) provided in proximity to the shake compensation unit 111 is input to the variable gain unit 1003. The temperature variation coefficient corresponding to the lens barrel temperature is stored in advance in a memory, and the gain (K) value is controlled in response to change in temperature. The translational velocity can be estimated by adding the temperature change in the coil output characteristics of the shake compensation unit 111 resulting from the change in the lens barrel temperature. The information for the drive impelling force output by the variable gain unit 1003 and the information for the relative displacement output by the Hall element are input to the Kalman filter 1001. The Kalman filter 1001 as described above estimates the absolute velocity driven unit 701 of the shake compensation unit 111 and the relative displacement of the driven unit 701 and the fixed unit 801. The first derivative of the estimated relative displacement is obtained by the differentiating device 1004 as the relative velocity, and then is added to the estimated absolute velocity of the driven unit 701 by the adding unit 1005. An estimated amount (estimated velocity) for translational shake is calculated in this manner. Although the calculation performed by the adding unit 1005 is actually a subtraction, for the purposes of description, such calculations will be treated as the same calculation including the addition of a negative value (subtraction) in the absence of an express indication to the contrary.

The translational shake gain calculation unit 1007 acquires zoom information 902 from a zoom control unit (not shown), and a gain setting for the translational shake variable gain unit 1006 is performed in a subsequent step by the adding unit 1005. The gain coefficient is multiplied with the output of the adding unit 1005 by the translational shake variable gain unit 1006 to thereby calculate the final translational shake estimation velocity (hereinafter referred to as "estimated translational velocity").

Next, the translational shake gain calculation performed by the translational shake gain calculation unit 1007 based on the zoom information 902 will be described.

Figure 8:
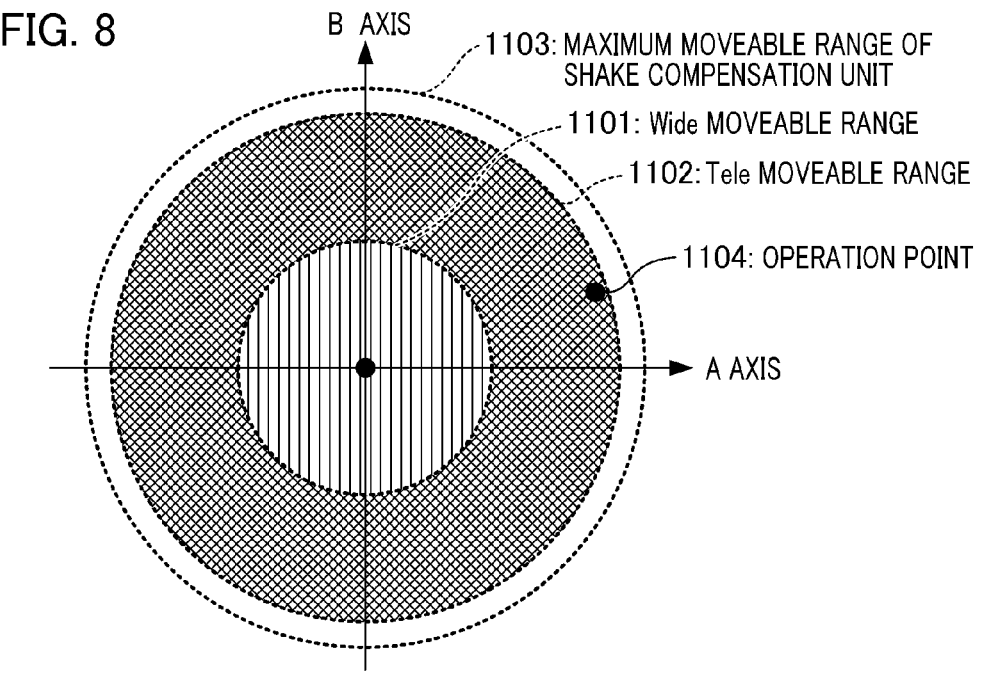
FIG. 8 describes the shake compensation range.

FIG. 8 describes the shake compensation range in which the A axis and the B axis are two mutually orthogonal axes illustrated in a plane that is orthogonal to the optical axis of the imaging optical system. The Wide moveable range 1101 is a shake compensation range at a zoom position at which the focal distance of the imaging optical system is shortest. The Tele moveable range 1102 is a shake compensation range at a zoom position at which the focal distance of the imaging optical system is longest. These ranges are in the maximum moveable range 1103 of the shake compensation unit 111. The operating point 1104 of the shake compensation unit 111 is exemplified in the Tele moveable range 1102.

In general shake compensation, although the Tele moveable range 1102 is larger than the Wide moveable range 1101, this depends on the degree of the effect of the rotational shake amount on the imaging surface. Even at the same rotational shake amount, the rotational shake amount on the imaging surface will increase relative to an increase in the length of the focal distance, and as a result, the shake compensation unit 111 is driven and increases the shake compensation amount to be compensated. As a result, the setting is configured to create a shake compensation range in which the Tele moveable range 1102 is greater than the Wide moveable range 1101.

A difference in the accuracy of the estimated translational velocity is produced when the operating point 1104 of the shake compensation unit 111 is in the Wide moveable range 1101, and when in the Tele moveable range 1102. In particular, in the Tele moveable range 1102, when the operating point 1104 approaches the end of the maximum moveable range for shake compensation, the linear characteristics of the mechanism unit cease to apply, and an error is produced in the translational shake estimation value from the estimation unit.

Even at the same rotational shake amount, the difference in the focal distance causes a difference in the rotational shake compensation amount during Wide imaging and the rotational shake compensation amount during Tele imaging, and therefore the latter value is larger. Therefore, when there is an error in the current-impelling force conversion, an output error of the Kalman filter 1001 during Tele imaging will be larger than an output error for the Kalman filter 1001 during Wide imaging.

In this context, the translational shake gain calculation unit 1007 changes the value of the gain coefficient set in the translational shake variable gain unit 1006 in response to the focal distance in order to avoid excessive compensation of translational shake compensation. That is to say, in comparison to the operation point 1104 being in the Wide moveable range 1101, the calculation is performed so that the value is smaller when in the Tele moveable range 1102. As a result, even when detecting the same shake amount, the Tele rather than the Wide value is associated with a small translational shake compensation amount.

Figure 9:
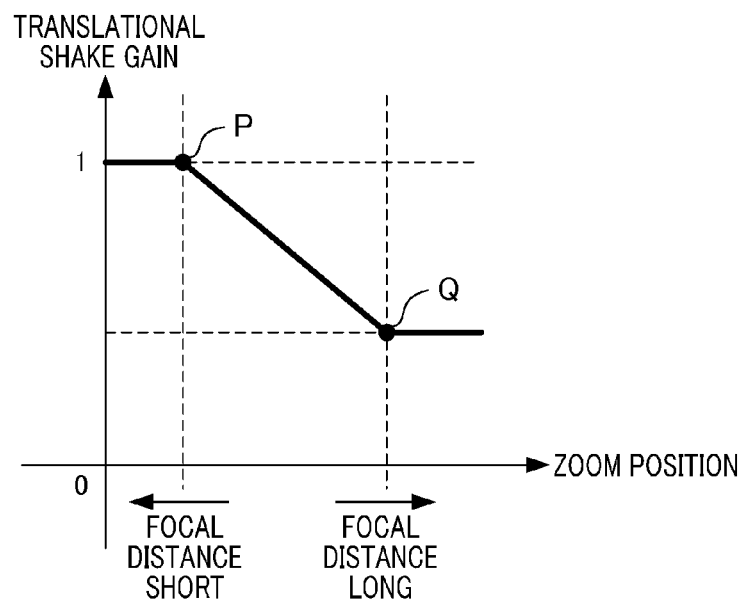
FIG. 9 is a graph illustrating the relationship between translational shake gain and the focal distance.

FIG. 9 is a graph illustrating the relationship between the zoom position on the horizontal axis and the translational shake gain (coefficient) on the vertical axis. At a point P, the gain value is 1, the gain value has a value of less than 1 at the point Q, and therefore the line PQ has a negative gradient that slopes downward to the right.

When the focal distance is short as illustrated in the figure, the translational shake gain is set to a value near to 1, and the gain value at the point P takes a value of 1. In the present example, even when the focal distance becomes shorter, the value remains a fixed value of 1. Alternatively, when the focal distance increases, a gain value smaller than 1 is set. The shake compensation range expands corresponding to an increase in the length of the focal distance, and the gain value becomes correspondingly smaller. When the shake compensation range is varied in response to the focal distance, the translational shake gain is set to a smaller value when the shake compensation range is wide (large focal distance) than when the shake compensation range is narrow (small focal distance). In the present example, the gain value takes a minimum value at the point Q and therefore, even when the focal distance increases, the gain value is fixed. A curved line or bent line may be used as the shape of the graph line as long as the setting of the gain value decreases as the focal distance increases. Furthermore, the translational shake gain can be set to decrease when the focal distance exceeds a predetermined value by execution of a determination process in relation to whether or not the focal distance is longer than a predetermined value (threshold value).

Returning now to FIG. 6, the method of compensation for translational shake.

The output of the rotational velocity meter 108 is input to the CPU 106, and processed by the HPF integral filter 901. This signal is integrated and converted to a rotational signal after cutting of DC components by a HPF that configures a HPF integral filter 909. The output of the HPF integral filter 909 is input to a gain adjustment unit 910. The gain adjustment unit 910 is provided with a gain adjustment filter, and in conjunction with the processing of the HPF integral filter 909, adjusts the gain and the phase characteristics in the frequency band for translational shake compensation. The output of the gain adjustment unit 910 is subjected to compensation by an output compensation unit 911, configured as a compensation target value for translational shake, combined in the adding device 912, and added with the compensation target value for rotational shake described above.

In parallel with the above processing, the output of the rotational velocity meter 108 is input to the HPF phase adjustment unit 904. The HPF that configures the HPF phase adjustment unit 904 cuts the DC components in the rotational velocity detection signal, and then executes a phase adjustment on the signal. The output of the HPF phase adjustment unit 904 is extracted only in relation to frequency components in a predetermined band by the rotational velocity BPF (band pass filter) unit 906.

The output of the estimation device 905 (estimated translational velocity) is sent to the translational velocity BPF unit 907, and only frequency components in the predetermined band are extracted. Each output of the rotational velocity BPF unit 906 and the translational velocity BPF unit 907 are input to the comparing unit 908 to thereby calculate a compensation amount (compensation coefficient (correction coefficient)) for compensation of the output of the gain adjustment unit 910. The calculation for the compensation coefficient (correction coefficient) executed by the comparing unit 908 is described hereafter.

Position information for the zoom and focus are input into the output compensation unit 911 and the information is used to calculate an imaging magnification. The output of the gain adjustment unit 910 is compensated using the calculated imaging magnification and the compensation amount from the comparing unit 908 to thereby calculate a compensation target value for the translational shake. The compensation target value for the translational shake is added with the compensation target value for rotational shake in the adding unit 912. The addition result is output to the drive unit 110, and in this manner, the shake compensation unit 111 is driven to compensate for image shake with reference to both rotational shake and translational shake.

The compensation amount calculated by the comparing unit 908 will be described.

Figure 10:
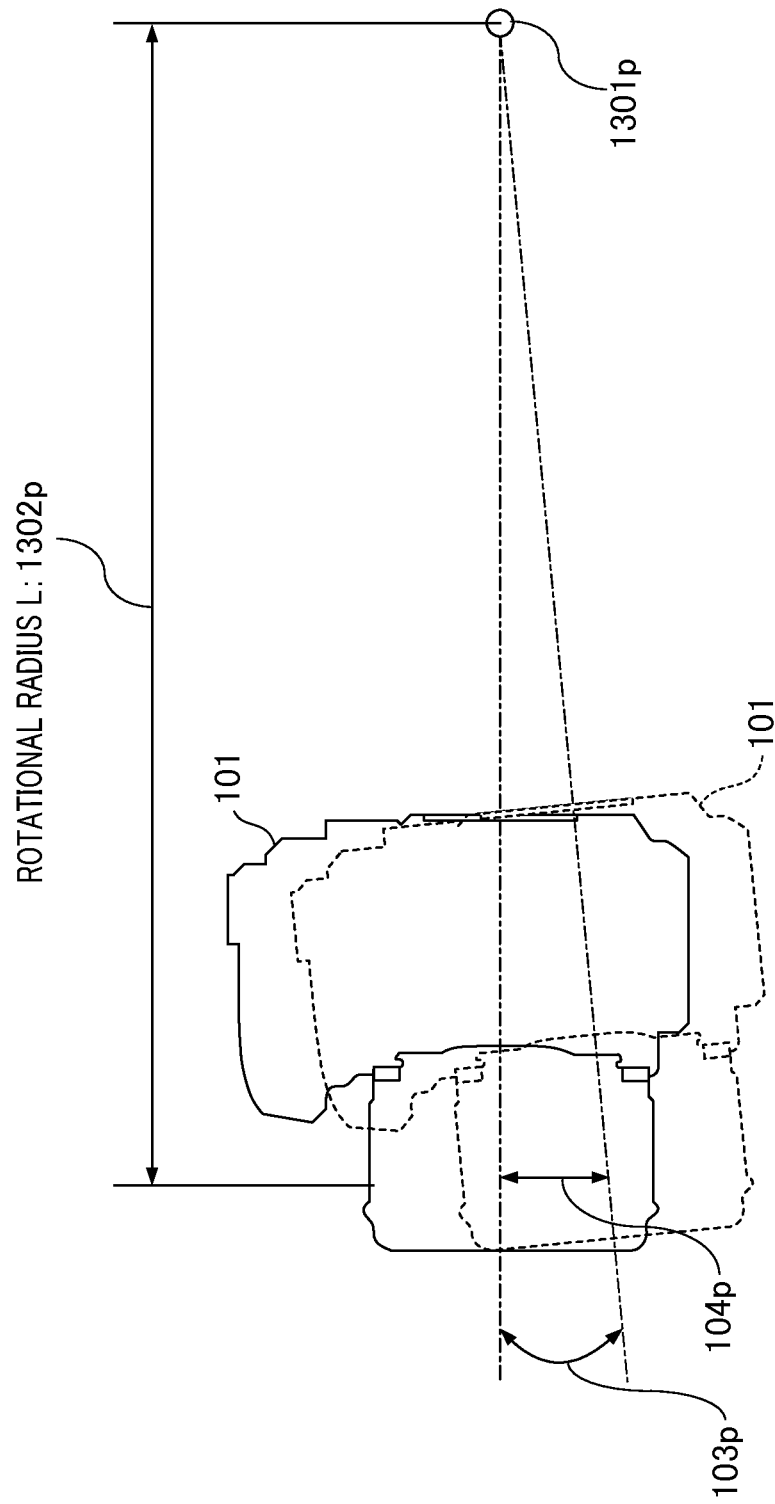
FIG. 10 illustrates the rotation center of shake applied to the image capturing apparatus.

FIG. 10 schematically illustrates the rotational shake 103p and the translational shake 104p added to the image capturing apparatus when viewed from the side. The dimension of the translational shake 104p at the principal point position of the imaging optical system of the image capturing apparatus 101 is denoted as Y. The dimension of the rotational shake 103p is denoted as θ, and the rotational radius when the rotation center is determined as 0 (refer to 1301p) is denoted as L (refer to 1302p). These relationships are expressed by Equation (9) and (10) below.

[Equation 11]

$$Y = L \times \theta \quad (9)$$

$$V = L \times \omega \quad (10)$$

V denotes velocity, and the rotational velocity is denoted as ω. The rotational radius L (refer to 1302p) is the distance from the rotational center 1301p to the shake compensation unit 111. Herein, the displacement Y in Equation (9) is calculated as the first integral of the estimated translational velocity output by the estimation device 905, θ is calculated as the first integral of the output of the rotational velocity meter 108p, and the length L is calculated as the ratio of the two values. According to Equation (10), the velocity V is calculated as the estimated translational velocity output by the estimated device 905, and w is calculated from the output of the rotational velocity meter 108p, the length L of the rotation radius is calculated as the ratio of the two values. The value for L can be calculated by either method.

The rotation radius L may be calculated by obtaining a peak value calculated for the respective maximum amplitudes of the velocity V and the rotational velocity ω in a predetermined time, and the value for L calculated from the ratio of those values. The predetermined time is a period of substantially 200 ms when the cut-off frequency of the velocity BPF unit 906 and the translation velocity BPF unit 907 is 5 Hz. Furthermore, the rotational radius L may be updated at each instant of calculation of the velocity V and the rotational velocity ω. At that time, high-frequency noise components when calculating the rotation radius may be removed by averaging the velocity V and the rotational velocity ω time-sequentially or by cutting the high frequency components using a low pass filter (LPF).

A shake amount δ produced by the image surface is calculated in Equation (11) below from the displacement Y of the translational shake at the principal point position of the imaging optical system, the shake angle θ, the focal distance f and the imaging magnification β of the imaging optical system.

[Equation 12]

$$\delta=(1+\beta)\times f\times\theta+\beta\times Y \quad (11)$$

The value for f in the first term on the right side of Equation (11) is calculated from the positional information 902 for the zoom lens and the focus lens of the imaging optical system. The imaging magnification β expresses a magnification of the size of the object to be imaged that is condensed on the imaging element 107 relative to the size of the actual object to be imaged, and this is also calculated using the positional information 902 for the zoom lens and the focus lens of the imaging optical system. The shake angle θ is calculated from the integration result for the output of the rotational velocity meter 108p. Therefore, a rotational shake compensation target value may be calculated as described with reference to FIG. 6 using this information.

The second term on the right side of Equation (11) above is calculated from the first integral of the estimated translational velocity output from the estimating device 905 and the imaging magnification β obtained from the positional information 902 for the zoom lens and the focus lens. The translational shake compensation target value as described with reference to FIG. 6 may be calculated in this manner.

However, in the present exemplary embodiment, image shake compensation with reference to the shake amount δ when Equation (11) is rewritten as shown in Equation (12) below.

[Equation 13]

$$\delta=(1+\beta)\times f\times\theta+\beta\times L\times\theta \quad (12)$$

That is to say, the displacement Y of translational shake calculated directly from the estimated translation velocity output by the estimating device 905 is not used in relation to translational shake. The length L of the rotation diameter is calculated from Equation (9) or Equation (10), and then the value for L, the integration result of the output of the rotational velocity meter 108p (θ), and the imaging magnification β are multiplied to calculate the compensation value. The compensation amount (β, L) that is calculated by the comparing unit 901 in FIG. 6 in the shake coefficient calculation and output to the output compensation unit 911 is a compensation coefficient (correction coefficient) for θ.

Figure 11:
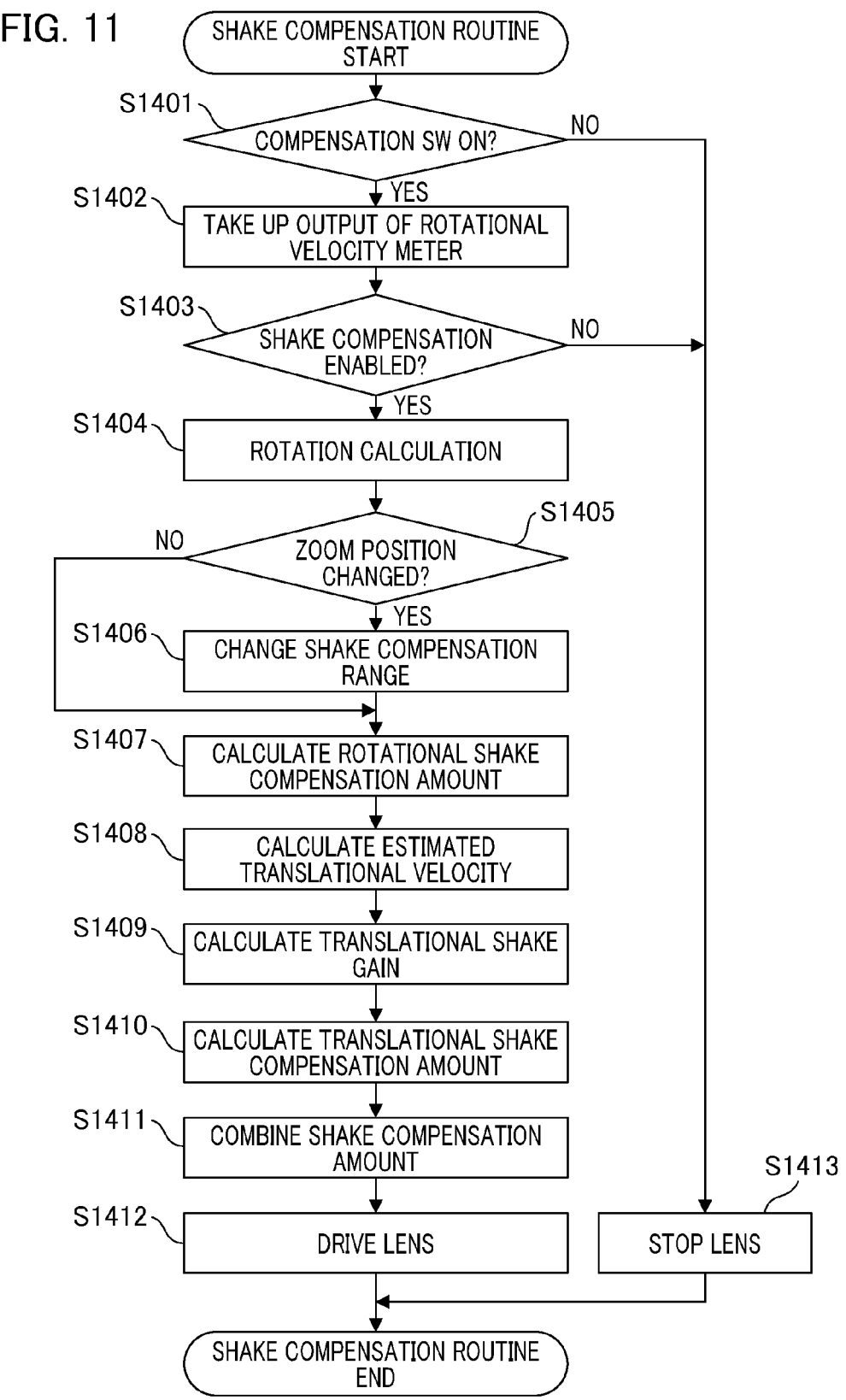
FIG. 11 is a flowchart illustrating the operation of the shake compensation control apparatus according to the first exemplary embodiment.

The overall operation for shake compensation control will be described next making reference to FIG. 11. The flowchart in FIG. 11 starts when the main power source of the image capturing apparatus is placed in the ON position, and is executed on each fixed sampling cycle in accordance with a program executed by interpretation by the CPU 106.

Firstly, in S1401, it is determined whether or not a shake compensation mode switch (SW) (not shown) has been operated by a user. When the shake compensation mode SW is in the ON state, the processing proceeds to S1402, and when in the OFF state, the processing proceeds to S1413. In S1402, the CPU 106 takes up the detection signal of the rotational velocity meter 108. Next, in S1403, the CPU 106 determines whether or not shake compensation is enabled, and when shake compensation is enabled, the processing proceeds to S1404. When shake compensation is not enabled, the processing proceeds to S1413. In S1403, it is determined that shake compensation is not enabled in the period from supply of power to stabilization of the output of the rotational velocity meter 108. It is determined that shake compensation is enabled after the output of the rotational velocity meter 108 becomes stabilized. In this manner, a reduction in shake compensation performance can be prevented when the output value immediately after power supply is unstable.

In S1404, the rotation angle is calculated using the method described using FIG. 6. This rotation angle functions as the output value of the HPF integrated filter 901 in FIG. 6. Next in S1405, it is determined whether or not the zoom position has changed. When the zoom position has changed from the previous occasion, the processing proceeds to S1406, and when there is no changed, the processing proceeds to S1407.

After the shake compensation range has changed (refer to FIG. 8) in response to the zoom position in S1406, the processing proceeds to S1407. In S1407, the rotational shake amount is calculated as described above using the rotational calculation result calculated in S1404 and the focal distance and imaging magnification calculated using the zoom and focus positional information 902. The rotational shake compensation amount is an output value of the sensitivity adjustment unit 903. Next in S1408, the estimated translational velocity is calculated as described above (refer to FIG. 5 to FIG. 7), and in S1409, the calculation of the translational shake gain is performed using the zoom position (refer to FIG. 9). In the following step S1410, the translational shake gain calculated in S1409 is multiplied by the translational velocity calculated in S1408. Furthermore, the rotation radius is calculated using the method described with reference to FIG. 10. The translational shake compensation amount is calculated using the calculated rotation radius and the zoom and focus positional information 902, and the processing proceeds to S1411. The calculated translational shake compensation amount is the output value of the output compensation unit 911 in FIG. 7. The shake compensation amount is combined, and the adding unit 912 adds the rotational shake compensation amount and the translational shake compensation amount. The drive unit 110 drives the shake compensation unit 11 based on the shake compensation amount in S1412, and the subroutine for shake compensation is completed. The processing is configured in a standby configuration until the next sampling period.

On the other hand, when the processing proceeds from S1401 and S1403 to S1413, the driving of the shake compensation unit 111 is stopped, and the subroutine for shake compensation is completed. The processing is configured in a standby configuration until the next sampling period.

In the first exemplary embodiment as described above, the relative displacement of the driven unit and the fixed unit of the shake compensation mechanism is taken as a state parameter, the driving impelling force on the shake compensation unit is taken as an input variable, and an estimation unit is used to estimate the absolute velocity of the driven unit and the relative displacement of the driven unit and the fixed unit. The estimated translation velocity is calculated to thereby obtain a translational shake compensation amount. As described above, since the shake compensation mechanism and the driving unit are used, there is no need for further provision of an acceleration meter or the like. Therefore, the number of constituent components is not increased, a compact and low-cost configuration can be realized, and simultaneous compensation of both rotational shake and translational shake is enabled.

When the shake compensation range is increased, it may be the case that the translational shake estimation process is executed in a region in which the shake compensation unit diverges from the moveable center and does not display linear characteristics. Furthermore, where there is a large error in the current current-impelling force conversion by reason of a variation in the rotational shake compensation amount caused by a difference in the focal distance, there is a risk that the larger rotational shake compensation amount will be associated with a larger error also in relation to the estimated translational velocity. As described above, under conditions in which the focal distance is increased, the translational shake gain is set to a small value than when the focal distance is short. When the shake compensation range is varied as a result of the focal distance, the translational shake gain is set to a smaller value when the shake compensation range is wide than when the shake compensation range is narrow. In other words, since the effect of the translational shake estimation error is mitigated when the shake compensation range is wide, the estimated translational velocity can be intentionally set to a small value. In this manner, when the focal distance is large or when the shake compensation range is wide, excessive compensation for translational shake compensation due to an erroneous operation of translational shake compensation can be prevented.

In this manner, even when the moveable range (compensation range) of the focal distance or the shake compensation unit varies, a reduction in the shake compensation performance resulting from excessive compensation for translational shake compensation can be prevented, and shake compensation performance in relation to translational shake compensation can be improved.

In the present exemplary embodiment, a method of optical shake compensation was described in which the shake compensation lens (image blur correction lens) was moved in a plane vertical to the optical axis as a shake compensation unit. However, the invention is not limited to a method of optical shake compensation, and the following configurations may be used.

a configuration in which shake compensation is performed by displacement of an imaging element in a plane that is vertical to the optical axis.
   a configuration using electronic shake compensation for reducing the effect of shake by varying the segmenting position of the image in each imaging frame output by the imaging element.
   a configuration of executing shake compensation by combination of a plurality of methods of shake compensation control.

Various configurations are enabled in relation to the estimation of translational shake. For example, when a shake compensation mechanism is used that executes shake compensation by displaying the imaging element in a plane that is vertical to the optical axis, if the relative displacement of the driven unit and the fixed unit of the shake compensation mechanism is observed, the estimated translation velocity can be calculated by the estimation unit. That is to say, when the estimation unit is configured so that the relative displacement of the driven unit and the fixed unit of the shake compensation mechanism is taken as the state parameter, and the driving impelling force on the shake compensation mechanism is taken to be an input variable, the absolute velocity of the camera main body unit can be detected by the same method as that described above.

Second Exemplary Embodiment

A second exemplary embodiment of the present invention will be described next.

Figure 12:
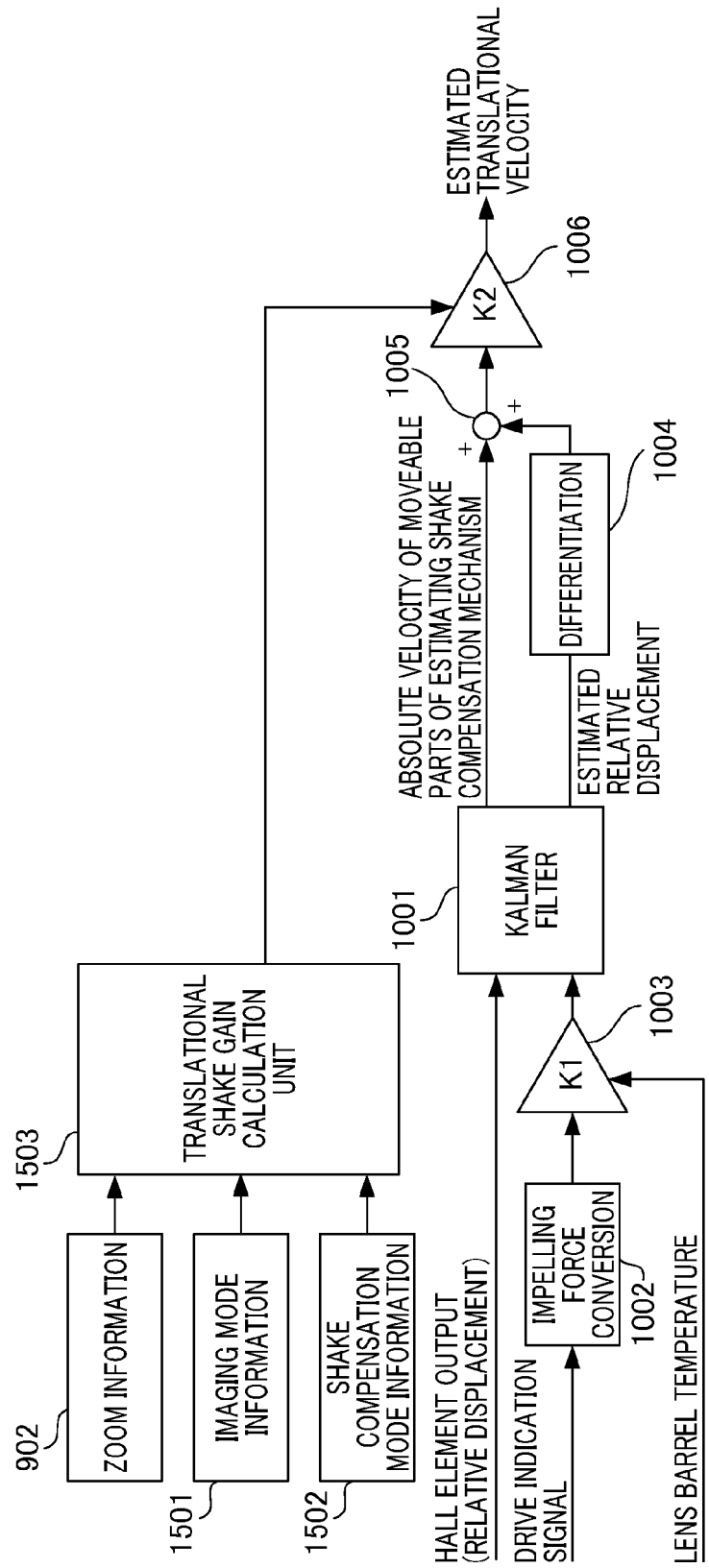
FIG. 12 is a block diagram illustrating a configuration example of an estimation device of a shake compensation control apparatus in order to describe a second exemplary embodiment of the present invention in conjunction with FIG. 13 and FIG. 14.

FIG. 12 is a block diagram illustrating a configuration example of the internal unit of the estimating device according to the second exemplary embodiment. Those constituent elements which are the same as those in the first exemplary embodiment are denoted by the same reference numerals, detailed description of those elements will not be repeated and the description will focus on the points of difference from the first exemplary embodiment.

The differences between FIG. 6 and FIG. 12 are as follows.
(1) Imaging mode information 1501 and shake compensation mode information 1502 are input to the translational shake gain calculation unit 1503.
(2) The translational shake gain calculation unit 1503 calculates translational shake gain based on the imaging mode information 1501, the shake compensation mode information 1502, and the zoom information 902.

The imaging mode information 1501 is information set in response to whether the mode is still-image imaging mode or moving-image imaging mode. The shake compensation mode information 1502 is information set in response to the shake compensation mode 1 and 2 as illustrated below, and when selecting each mode, the shake compensation range of that information is different when imaging a moving image.

shake compensation mode 1=although the shake compensation range when imaging a moving image is not very different from that when imaging a still image, this mode emphasizes shake compensation stability, and shake compensation performance is obtained that is stable even during imaging immediately after a panning operation.
   shake compensation mode 2=the mode improves shake compensation performance in relation to a large variation such as when walking in which the shake compensation range is increased during imaging of moving images.

Figure 13:
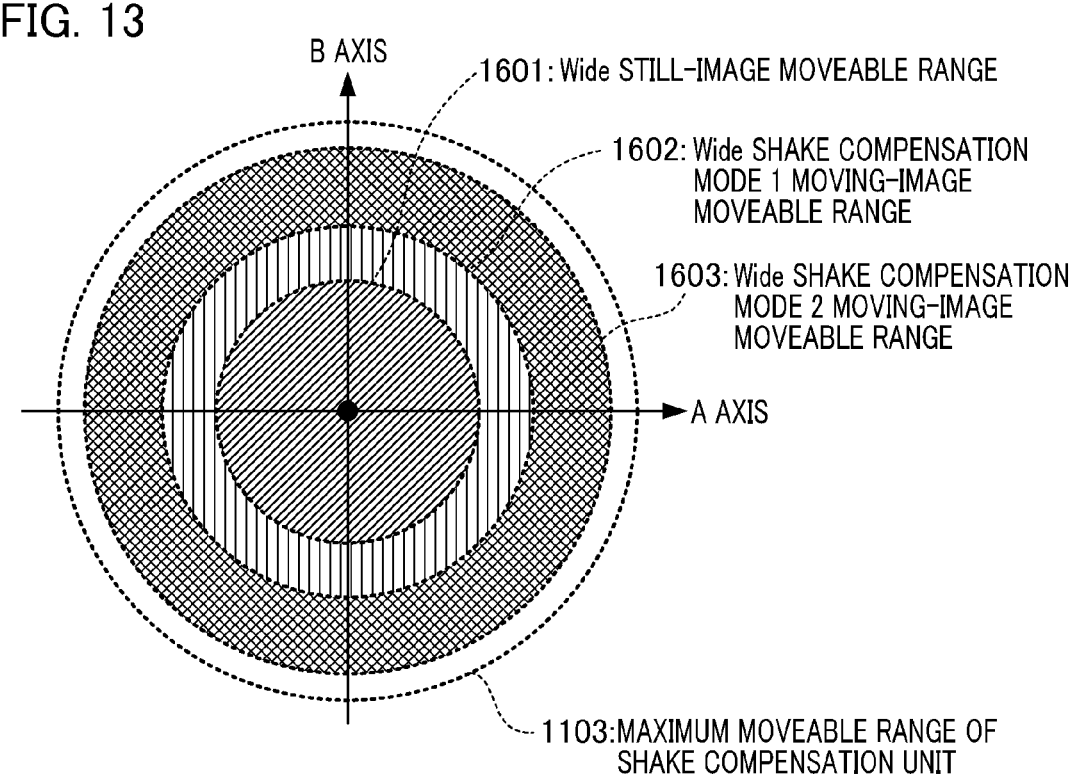
FIG. 13 describes a shake compensation range.
Figure 14:
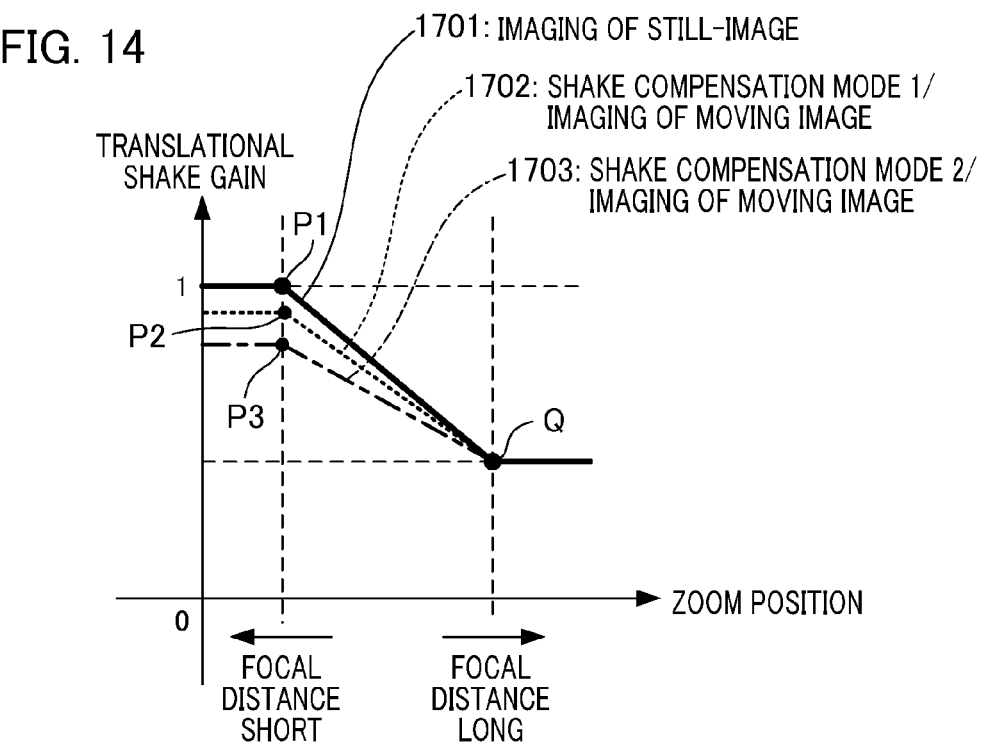
FIG. 14 is a graph describing the differences between imaging mode and shake compensation mode with respect to the relationship between the translational shake gain and the focal distance.

FIG. 13 illustrates the shake compensation range when the focal distance is at the shortest zoom position (during Wide imaging). FIG. 14 illustrates three types of graph describing the relationship between the shake compensation range and the imaging mode (still-image imaging and moving-image imaging) and the gain coefficient (for the translational shake compensation amount).

The shake compensation range 1601 during still-image imaging mode has the narrowest range, the shake compensation range 1602 during shake compensation mode 1 is wider than the shake compensation range 1601. The shake compensation range 1603 during shake compensation mode 2 is wider than the shake compensation range 1602. That is to say, the dimension of the shake compensation range is set to satisfy the relationship such that "still-image imaging mode<shake compensation mode 1 during imaging of moving images<shake compensation mode 2 during imaging of moving images".

When the shake compensation range is wide, it may be the case that the translational shake estimation process is executed in a region that diverges from the moveable center in which the mechanism does not display linear characteristics. As illustrated by the graph in FIG. 14, the calculation of the gain coefficient is performed by varying the reference table for the shake compensation gain calculation in response to the zoom position, the imaging mode or the shake compensation mode. FIG. 14 illustrates the zoom position on the horizontal axis and the translational shake gain on the vertical axis. The gain value at the point P1 is 1, the graph line 1702 illustrated by the dotted line illustrates the setting under the shake compensation mode 1 during imaging of a moving image. The gain value at the point P2 is less than 1. The graph 1703 illustrated by the dot-dash line illustrates the setting under the shake compensation mode 2 during imaging of a moving image. The gain value at the point P3 is smaller than the gain value at the point P2. In either case, the gain value takes a minimum value at the point Q when the focal distance is long. The lines P1Q, P2Q, P3Q have a negative gradient, that is a downward slope to the right, and the size of the gradient becomes successively smaller.

When the imaging mode is moving-image imaging, in the shake compensation mode 1, the shake compensation range is wider than during still-image imaging mode. Therefore, as illustrated by the graph line 1702, a reference table is used in which the gain is set to a smaller value than the graph line 1701 for imaging of a still image. As a result, the translational shake compensation amount is smaller than during imaging of a still image. Furthermore, in the shake compensation mode 2, the shake compensation range is even wider than during still-image imaging mode and shake compensation mode 1. As a result, as illustrated by graph line 1703, a reference table is used in which the gain coefficient is set to a further smaller value than the other graph lines 1701, 1702. Consequently, the translational shake compensation amount is smaller than in other modes. The calculation may be configured so that the shake compensation range is compared with a predetermined value (threshold value) and when the shake compensation range is larger than the predetermined value rather than when the shake compensation range is less than or equal to a predetermined value, the translational shake compensation amount takes a smaller value relative to the same translational shake.

In the second exemplary embodiment, during a condition under which the shake compensation range increases, the translational shake gain is set to a smaller value than when the shake compensation range is narrow. That is to say, since the effect of a translational shake estimation error produced when the shake compensation range is wide is mitigated, and therefore the estimated translation velocity is set intentionally to a small value. In this manner, excessive compensation for translational shake compensation when the shake compensation range is wide can be prevented. Even when the compensation range for the shake compensation unit is varied in response to the imaging mode or the shake compensation mode, since a reduction in the shake compensation performance resulting from excessive compensation for translational shake compensation can be prevented, shake compensation performance for translational shake compensation can be improved.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147528 filed Jul. 1, 2011 which is hereby incorporated by reference herein in its entirety.

What is claimed is:

1. A shake compensation control apparatus configured to compensate for image shake by detecting a shake of an apparatus, the shake compensation control apparatus comprising:
a shake compensation unit;
a compensation amount calculation unit configured to calculate a compensation amount using a shake amount for the shake-detected apparatus including translational shake produced in a direction of travel of the shake-detected apparatus along a direction that is orthogonal to an optical axis of an imaging optical system;
an estimation unit configured to estimate translational shake by inputting a position detection signal for a driven unit and a drive indication signal to the driven unit that configures the shake compensation unit; and
a drive unit configured to drive the shake compensation unit in accordance with the compensation amount,
wherein the compensation amount for translational shake is calculated based on the estimated amount for translational shake obtained from the estimation unit, and
wherein the compensation amount calculation unit is configured to calculate so that the compensation amount for translational shake is reduced if the focal distance of the imaging optical system is increased.

2. The shake compensation control apparatus according to claim 1, wherein when the focal distance of the imaging optical system is longer than a predetermined value, a calculation is performed so that the compensation amount is reduced in comparison to when the focal distance is shorter than the predetermined value.

3. The shake compensation control apparatus according to claim 1, comprising a rotational shake detection unit configured to detect the rotational shake produced by rotation of the shake-detected apparatus about an axis that is orthogonal to the optical axis of the imaging optical system,
wherein the compensation amount calculation unit includes (a) a first compensation amount calculation unit configured to calculate a compensation amount for rotational shake using a detection signal from the rotational shake compensation detection unit, and (b) a second compensation amount detection unit uses that the relative displacement of the driven unit of the shake compensation unit and the fixed unit that supports the driven unit as a state parameter, and the drive impelling force as an input variable to calculate the compensation amount of the translational shake using the estimation unit.

4. The shake compensation control apparatus according to claim 1, wherein the estimation unit is an estimation device that uses a Kalman filter, and
wherein the shake compensation control apparatus further comprises:
(a) a variable gain unit configured to multiply the gain coefficient by the output of the estimation unit; and
(b) a gain calculation unit configured to acquire information for the focal distance and the imaging optical system, calculate a gain coefficient and set the value to the variable gain unit.

5. An optical device comprising the shake compensation control apparatus according to claim 1.

6. An image capturing apparatus comprising the shake compensation control apparatus according to claim 1.

7. A shake compensation control apparatus configured to compensate for image shake by detecting a shake of an apparatus, the shake compensation control apparatus comprising:
a shake compensation unit;
a compensation amount calculation unit configured to calculate a compensation amount using a shake amount for the shake-detected apparatus including translational shake produced in a direction of travel of the shake-detected apparatus along a direction that is orthogonal to an optical axis of an imaging optical system;
an estimation unit configured to estimate translational shake by inputting a position detection signal for a driven unit and a drive indication signal to the driven unit that configures the shake compensation unit; and
a drive unit configured to drive the shake compensation unit in accordance with the compensation amount,
wherein the compensation amount for translational shake is calculated based on the estimated amount for translational shake obtained from the estimation unit, and wherein a compensation range for the shake compensation unit is calculated from the focal distance of the imaging optical system, and the compensation amount for translational shake is reduced as the compensation range becomes wider.

8. The shake compensation control apparatus according to claim 7, wherein when the focal distance of the imaging optical system is longer than a predetermined value, a calculation is performed so that the compensation amount is reduced in comparison to when the focal distance is shorter than the predetermined value.

9. The shake compensation control apparatus according to claim 7, comprising a rotational shake detection unit configured to detect the rotational shake produced by rotation of the shake-detected apparatus about an axis that is orthogonal to the optical axis of the imaging optical system,
wherein the compensation amount calculation unit includes (a) a first compensation amount calculation unit configured to calculate a compensation amount for rotational shake using a detection signal from the rotational shake compensation detection unit, and (b) a second compensation amount detection unit that uses the relative displacement of the driven unit of the shake compensation unit and the fixed unit that supports the driven unit as a state parameter, and the drive impelling force as an input variable to calculate the compensation amount of the translational shake using the estimation unit.

10. The shake compensation control apparatus according to claim 7, wherein the estimation unit is an estimation device that uses a Kalman filter, and
wherein the shake compensation control apparatus further comprises:
(a) a variable gain unit configured to multiply the gain coefficient by the output of the estimation unit; and
(b) a gain calculation unit configured to acquire information for the focal distance and the imaging optical system, calculate a gain coefficient, and set the value to the variable gain unit.

11. An optical device comprising the shake compensation control apparatus according to claim 7.

12. An image capturing apparatus comprising the shake compensation control apparatus according to claim 7.

13. A shake compensation control apparatus configured for use in relation to an image capturing apparatus that enables imaging of a still image or a moving image, and configured to compensate for image shake by detecting a shake of the image capturing apparatus, the shake compensation control apparatus comprising:
a shake compensation unit;
a compensation amount calculation unit configured to calculate a compensation amount using a shake amount for the image capturing apparatus including translational shake produced in a direction of travel of the image capturing apparatus along a direction that is orthogonal to an optical axis of an imaging optical system;
an estimation unit configured to estimate translational shake by inputting a position detection signal for a driven unit and a drive indication signal to the driven unit that configures the shake compensation unit; and
a drive unit configured to drive the shake compensation unit in accordance with the compensation amount,
wherein the compensation amount for translational shake is calculated based on the estimated amount for translational shake obtained from the estimation unit, and
wherein the compensation amount calculation unit is configured to calculate so that the compensation amount for translational shake is reduced when imaging a moving image as compared to when imaging a still image.

14. The shake compensation control apparatus according to claim 13, wherein selection is enabled of a plurality of shake compensation modes in which the compensation range of the shake compensation unit is different when imaging a moving image, and
wherein the compensation amount calculation unit calculates so that the compensation amount is reduced when the compensation range becomes wider.

15. The shake compensation control apparatus according to claim 13, wherein
when the focal distance of the imaging optical system is longer than a predetermined value, a calculation is performed so that the compensation amount is reduced in comparison to when the focal distance is shorter than the predetermined value.

16. The shake compensation control apparatus according to claim 13, comprising an rotational shake detection unit configured to detect the rotational shake produced by rotation of the image capturing apparatus about an axis that is orthogonal to the optical axis of the imaging optical system,
wherein the compensation amount calculation unit includes (a) a first compensation amount calculation unit configured to calculate a compensation amount for rotational shake using a detection signal from the rotational shake compensation detection unit, and (b) a second compensation amount detection unit that uses the relative displacement of the driven unit of the shake compensation unit and the fixed unit that supports the driven unit as a state parameter, and the drive impelling force as an input variable to calculate the compensation amount of the translational shake using the estimation unit.

17. The shake compensation control apparatus according to claim 13, wherein the estimation unit is an estimation device that uses a Kalman filter, and
wherein the shake compensation control apparatus further comprises:
(a) a variable gain unit configured to multiply the gain coefficient by the output of the estimation unit; and
(b) a gain calculation unit configured to acquire information for the focal distance and the imaging optical system, calculate a gain coefficient and set the value to the variable gain unit.

18. An optical device comprising the shake compensation control apparatus according to claim 13.

19. An image capturing apparatus comprising the shake compensation control apparatus according to claim 13.

20. A control method of shake compensation for detecting translational shake produced in a direction of travel of an apparatus along a direction that is orthogonal to an optical axis of an imaging optical system, and driving a shake compensation unit to compensate image shake, the method comprising the steps of:
estimating a translational shake using an estimation unit that is configured from a vibration model for the shake compensation unit by inputting a position detection signal for a driven unit and a drive indication signal to the driven unit that configures the shake compensation unit; and
calculating so that a compensation amount for translational shake is calculated based on the estimated amount for translational shake obtained from the estimation unit, wherein the compensation amount for translational shake is reduced if the focal distance of the imaging optical system is increased.

21. A shake compensation control apparatus configured to compensate for image shake by detecting a shake of an apparatus, the shake compensation control apparatus comprising:
 a shake compensation unit;
 a compensation amount calculation unit configured to calculate a compensation amount using a shake amount for the shake-detected apparatus including translational shake produced in a direction of travel of the shake-detected apparatus along a direction that is orthogonal to an optical axis of an imaging optical system;
 an estimation unit configured to estimate translational shake; and
 a drive unit configured to drive the shake compensation unit in accordance with the compensation amount,
 wherein the compensation amount for translational shake is calculated based on the estimated amount for translational shake obtained from the estimation unit, and
 wherein the compensation amount calculation unit is configured to calculate so that the compensation amount for translational shake is reduced if the focal distance of the imaging optical system is increased.

22. A shake compensation control apparatus configured to compensate for image shake by detecting a shake of an apparatus, the shake compensation control apparatus comprising:
 a shake compensation unit;
 a compensation amount calculation unit configured to calculate a compensation amount using a shake amount for the shake-detected apparatus including translational shake produced in a direction of travel of the shake-detected apparatus along a direction that is orthogonal to an optical axis of an imaging optical system;
 an estimation unit configured to estimate translational shake; and
 a drive unit configured to drive the shake compensation unit in accordance with the compensation amount,
 wherein the compensation amount for translational shake is calculated based on the estimated amount for translational shake obtained from the estimation unit, and
 wherein a compensation range for the shake compensation unit is calculated from the focal distance of the imaging optical system and the compensation amount for translational shake is reduced as the compensation range becomes wider.

23. A shake compensation control apparatus configured for use in relation to an image capturing apparatus that enables imaging of a still image or a moving image, and configured to compensate for image shake by detecting a shake of the image capturing apparatus, the shake compensation control apparatus comprising:
 a shake compensation unit;
 a compensation amount calculation unit configured to calculate a compensation amount using a shake amount for the image capturing apparatus including translational shake produced in a direction of travel of the image capturing apparatus along a direction that is orthogonal to an optical axis of an imaging optical system;
 an estimation unit configured to estimate translational shake; and
 a drive unit configured to drive the shake compensation unit in accordance with the compensation amount,
 wherein the compensation amount for translational shake is calculated based on the estimated amount for translational shake obtained from the estimation unit, and
 wherein the compensation amount calculation unit is configured to calculate so that the compensation amount for translational shake is reduced when imaging a moving image as compared to when imaging a still image.

24. A control method of shake compensation for detecting translational shake produced in a direction of travel of an apparatus along a direction that is orthogonal to an optical axis of an imaging optical system, and driving a shake compensation unit to compensate image shake, the method comprising the steps of:
 estimating a translational shake using an estimation unit that is configured from a vibration model for the shake compensation unit; and
 calculating so that a compensation amount for translational shake is calculated based on the estimated amount for translational shake obtained from the estimation unit, wherein the compensation amount for translational shake is reduced if the focal distance of the imaging optical system is increased.

25. A control method of shake compensation for detecting translational shake produced in a direction of travel of an apparatus along a direction that is orthogonal to an optical axis of an imaging optical system, and driving a shake compensation unit to compensate image shake, the method comprising the steps of:
 estimating a translational shake using an estimation unit that is configured from a vibration model for the shake compensation unit; and
 calculating so that a compensation amount for translational shake is calculated based on the estimated amount for translational shake obtained from the estimation unit, wherein a compensation range for the shake compensation unit is calculated from the focal distance of the imaging optical system and the compensation amount for translational shake is reduced as the compensation range becomes wider.

26. A control method of shake compensation for detecting translational shake, which is used in relation to an image capturing apparatus that enables imaging of a still image or a moving image, produced in a direction of travel of the image capturing apparatus along a direction that is orthogonal to an optical axis of an imaging optical system, and driving a shake compensation unit to compensate image shake, the method comprising the steps of:
 estimating a translational shake using an estimation unit that is configured from a vibration model for the shake compensation unit; and
 calculating so that a compensation amount for translational shake is calculated based on the estimated amount for translational shake obtained from the estimation unit, wherein the compensation amount for translational shake is reduced when imaging a moving image as compared to when imaging a still image.

* * * * *